United States Patent [19]

Lo

[11] Patent Number: 5,059,866
[45] Date of Patent: Oct. 22, 1991

[54] METHOD AND APPARATUS FOR COOLING ELECTRONS, IONS OR PLASMA

[75] Inventor: Shui-Yin Lo, Sherman Oaks, Calif.

[73] Assignee: Apricot S.A., Luxembourg, Luxembourg

[21] Appl. No.: 103,631

[22] Filed: Oct. 1, 1987

[51] Int. Cl.$^5$ .............................................. H01J 7/24
[52] U.S. Cl. ...................... 315/111.21; 315/111.41; 315/111.71; 315/111.81; 313/231.31
[58] Field of Search ..................... 315/111.21, 111.41, 315/111.81, 111.61, 111.71; 313/231.33; 250/423 R

[56] References Cited

U.S. PATENT DOCUMENTS

| | | | |
|---|---|---|---|
| 4,023,065 | 5/1977 | Koloc | 315/111.21 X |
| 4,447,732 | 5/1984 | Leung et al. | 315/111.81 X |
| 4,447,773 | 5/1984 | Aston | 315/111.81 X |
| 4,641,060 | 2/1987 | Dandl | 315/111.21 X |
| 4,682,026 | 7/1987 | Douglas | 315/111.81 X |
| 4,713,585 | 12/1987 | Ohno et al. | 315/111.21 X |
| 4,733,133 | 3/1988 | Dandl | 315/111.41 |
| 4,739,169 | 4/1988 | Kurosawa et al. | 315/111.81 X |
| 4,804,838 | 2/1989 | Miseki | 315/111.21 X |

Primary Examiner—Eugene R. Laroche
Assistant Examiner—Do Hyum Yoo
Attorney, Agent, or Firm—Ladas & Parry

[57] ABSTRACT

Method and apparatus for cooling plasma generated by an ion source. The plasma is expanded together with neutral gas in an evacuated expansion chamber and subjected to a magnetic field.

20 Claims, 3 Drawing Sheets

METHOD AND APPARATUS FOR COOLING ELECTRONS, IONS OR PLASMA

BACKGROUND OF THE INVENTION (i) Field of the Invention

This invention relates to a method and apparatus for cooling electrons, ions or plasma.

(ii) Prior Art

Almost all of the natural objects surrounding us on earth are neutral, and do not occur in a charged state. In order to obtain charged particles such as electrons, ions or plasma, it is necessary to separate the electrons from the nuclei inside atoms, by supplying energy. The energy necessary to ionize say hydrogen gas into electrons and protons is 13.6 eV per atom. To create a plasma consisting of electrons and protons requires supplying this energy by some means. The energy can be supplied either by a static or an alternating electric field. For the static electric field, an anode and cathode configuration is necessary. For an alternating electric field, the energy may be supplied by a radio frequency (RF) oscillator or microwave source. After the gas is ionised, the ions may be extracted by imposing a high voltage on the ionised gas. Normally, in creating a plasma, the gas is disturbed violently, and a very hot plasma is produced. The temperature of the plasma can be characterized by the energy spread $\Delta E$ in units of eV (1 electron volt = $1.2 \times 10^4$ Kelvin). For a duoplasma ion source the energy spread is in the range of 15–65 eV. For a microwave generated ion source, the energy spread is of the order of 1 eV. The smallest energy spread is achieved by the Colutron ion source $\Delta E \simeq 0.2$ eV. Such a device is manufactured commercially by Colutron Research Corporation 5420 Arapahoe, Boulder, Colo., 80303, United States of America. Further decrease is limited by the thermal temperature necessary (0.1 eV or 1000 K.) to create the plasma. Hence it is in general very difficult to decrease the energy spread to less than 0.1 eV. Cooling to energy spreads of this order or less may be termed "super-cooling".

BRIEF SUMMARY OF THE INVENTION

In accordance with one aspect of the invention, there is provided apparatus for cooling a plasma comprising an ion source for producing the plasma together with neutral gas, a substantially evacuatable plasma expansion chamber and means for substantially evacuating the expansion chamber, the expansion chamber being coupled to the ion source whereby the plasma and the neutral gas generated in the ion source are directed to and expand within the substantially evacuated chamber to effect cooling thereof. Generally, the ion source simultaneously generates both the plasma and neutral gas but the term "ion source" as used in this specification is intended to also encompass arrangements where one part of the source generates the plasma, and another separately generates the neutral gas.

The invention also provides a method of cooling plasma comprising directing the plasma together with neutral gas to a substantially evacuated plasma expansion chamber whereby the plasma and the neutral gas expand therewithin.

By the use of the method or apparatus of this invention, the temperature of the plasma may be reduced to the order of 1° K. (equivalent to an energy spread of $10^{-4}$ eV or less). During expansion within the substantially empty plasma expansion chamber, the temperature of the neutral gas as well as that of the plasma may be reduced from 10° K. to 1° K. The plasma may be further cooled, to a lower temperature, by passing it through a series of solenoids with alternating magnetic field. The temperature of the charged particles can be further reduced to the order of a millidegree ($10^{-3}$° K.) or a microdegree ($10^{-6}$° K.), or an equivalent energy spread of $\Delta \simeq 10^{-7}$ eV or $10^{-10}$ eV.

The cooling of plasma by expansion is known. The cooling of neutral gas by expansion is also known.

The cooling of pure electron plasma by expansion in one dimension under axial magnetic field has been speculated upon by D. H. E. Dublin and T. M. O'Neil. "Adiabatic Expansion of a Strongly Correlated Pure Electron Plasma". Phys. Rev. Lett 56, 728 (1986).

However, in the present invention, the cooling of the plasma through expansion under the influence of magnetic fields is performed together with the expansion of neutral gas. By this means, the transverse temperature of the plasma will be reduced through the collision of the neutral gas molecules during the expansion stage. If the neutral gas is not expanded together, the transverse temperature of the plasma will hardly be reduced.

BRIEF DESCRIPTION OF THE SEVERAL VIEWS OF THE ACCOMPANYING DRAWINGS

The invention is further described by way of example only with reference to the accompanying drawings in which.

DETAILED DESCRIPTION

It is well known in thermodynamics that when a gas expands adiabatically, its temperature, pressure, and density is related by the following equation:

$$\frac{T}{T_o} = \left[\frac{P}{P_o}\right]^{(\gamma-1)/\gamma} = \left[\frac{\rho}{\rho_o}\right]^{\gamma-1}$$

where $T_o$, $P_o$, $\rho_o$ are the temperature, pressure and density of the gas in the ion source, and T, P, $\rho$ are those in the gas expansion chamber. $\gamma$ is the heat capacity ratio $C_p/C_v$ which equals 5/3 for an ideal monatomic gas and 1.40 for a diatomic gas. Hence for the rapid expansion of a monatomic gas like helium ($\gamma = 5/3$) in an expansion chamber, the drop in temperature is far more than the expansion of a diatomic gas like hydrogen gas or deuterium gas.

For helium gas, if one begins under conditions such that $P_o = 1$ at (1 at $\simeq 10^3$ torr); $T_o = 1000°$ K. and $P = 10^{-6}$ torr, the final temperature after expansion is $T = 2.4 \times 10^{-6} T_o$.

For hydrogen or deuterium gas, if one begins under conditions such that $P_o = 1$ at, $T_o = 1000°$ K. and $P = 10^{-6}$ torr the final temperature is $T = 2.5 \times 10^{-3}$, $T_o = 2.5°$ K. If the plasma and the gas expand together, the plasma will be cooled in a similar fashion.

Figure 1:
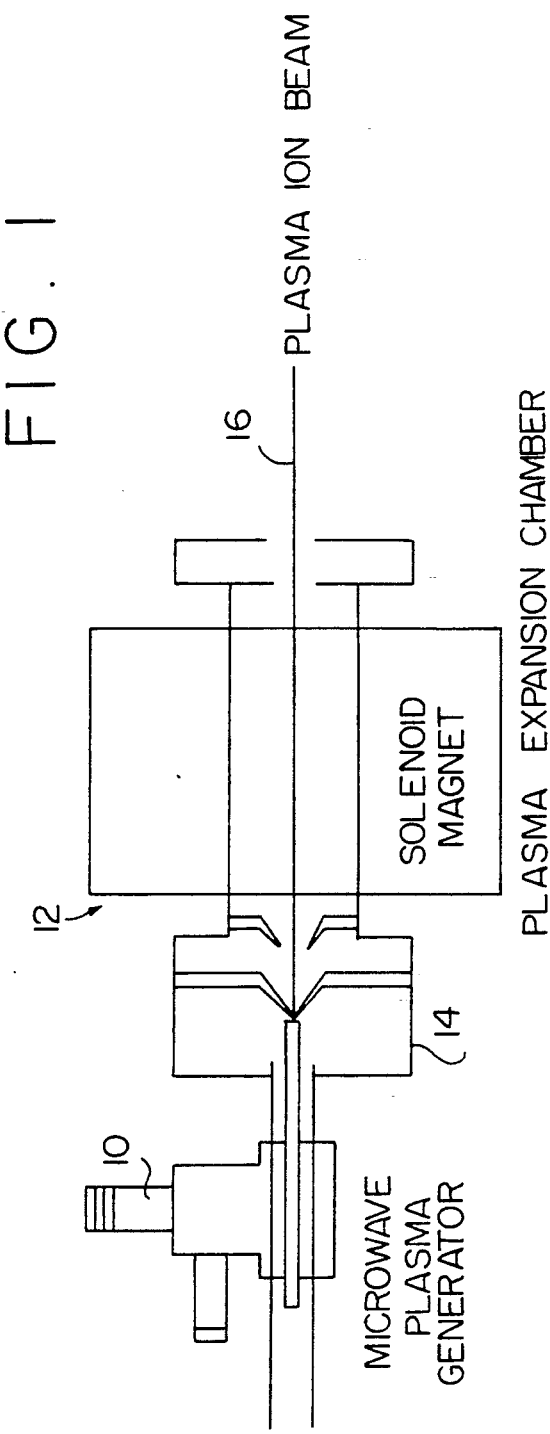
FIG. 1 is a diagram of one form of device useful in practicing the invention.

FIG. 1 shows, schematically, a plasma generator 10, in the form of an ion source, and the plasma expansion chamber 12.

The plasma and neutral gas emerging from the plasma generator 10 are collimated by a set of skimmers 14 so that particles with large transverse velocity will be excluded from the resultant plasma/ion beam 16.

In the plasma expansion chamber 12 diffusion pumps (not shown) are operated to lower the pressure. Several pumping stages may be necessary to lower the pressure from 1 atm to, for example, $10^{-6}$ torr.

A magnetic field in the plasma expansion chamber is created by either a solenoid coil with current flowing therethrough or by permanent magnets arranged in cylindrical symmetric fashion. The direction of the magnetic field is in the direction of the plasma beam so that the charged particles will not be impeded in their forward going motion by the magnetic field. The magnetic field serves to force the plasma to move forward so that in the plasma expansion chamber 12 the neutral gas can be pumped away while the plasma will not be lost. In this way, the density of the neutral gas will decrease while the density of the plasma will not decrease substantially during expansion.

The length of the solenoid can be adjusted to suit any purpose. For obtaining the largest numbers of charged particles, the solenoid should start from the nozzle of the plasma generator where the gas and plasma emerge. In this way substantially all the plasma may be trapped by the magnetic field to go forward.

For a very clean plasma, the solenoid may start after the set of skimmers 14, as shown in FIG. 1.

The symmetry axis of the solenoid may be arranged (not shown in FIG. 1) to deviate by a few degrees from the direction of the neutral gas jet, so that the plasma jet can be separated from the neutral gas jet by application of a magnetic field in the transverse direction with a dipole magnet. In the extraction of the plasma ion beam, neutral gas beams may be readily excluded.

Figure 2:
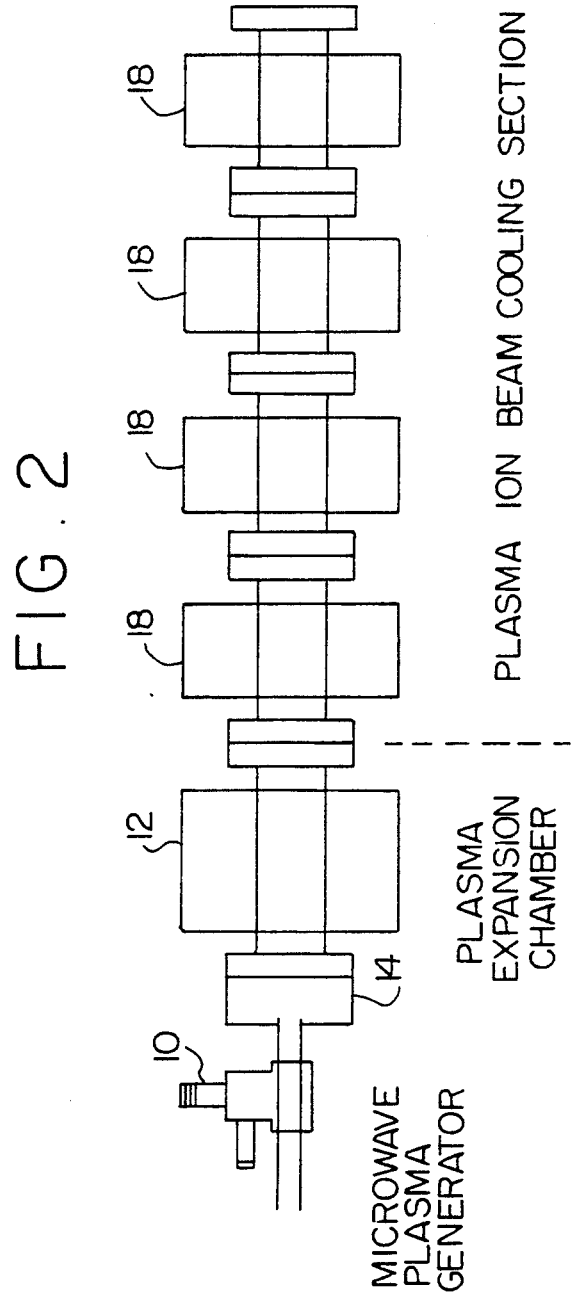
FIG. 2 is a diagram of an alternative device constructed in accordance with the invention.

After a cool plasma beam is formed in the expansion chamber 12, the plasma can pass directly outside the chamber. A negative applied voltage may be used to extract a positively charged ion beam from the plasma. A positive applied voltage will, alternatively or additionally, extract an electron beam. If further cooling is required, the plasma beam can be passed through a series of solenoids 18 operated to produce changing magnetic fields, as shown in FIG. 2. In FIGS. 1 and 2, like reference numerals denote like components.

The transverse kinetic energy, $K_\perp$, will be reduced by a rate $$\frac{\delta K_\perp}{K_\perp} \simeq \frac{\delta B}{B}$$

(where $K_\perp$ is the transverse kinetic energy, and B is the magnetic field flux density) similar to a reduction of magnetic field B in each solenoid. The total reduction in the transverse energy spread for n solenoids is $$\left(\frac{\delta B}{B}\right)^n$$

The timing of the change of the magnetic field in each solenoid is important to determine whether the electron component or the ion component of the plasma is being cooled. For the same longitudinal energy, the electron travels.

$$\frac{V_e}{V_i} = \sqrt{\frac{m_i}{m_e}}$$

a factor $\sqrt{m_i/m_e}$ faster than the ions, where $V_e$, $V_i$ are the speeds of electrons and ions respectively and $m_e$, $m_i$ are the masses for electrons and ions respectively.

For deuterons, $\sqrt{m_d/m_e} @ 60$, $m_d$ being the deuteron mass. In this case, the magnetic field must be changed much more rapidly if the electron component in the plasma is to be cooled.

At the end of the cooling solenoid, the positive ion can be extracted by applying a negative potential, to produce a beam of very cool ion beams.

If the density of the plasma is high enough, the positively charged ions with integer spin may form a coherent beam.

If the timing of the change of magnetic field is arranged to cool the electron component of the plasma beam, a very cool electron beam can be extracted by applying positive bias voltage at the end of the solenoids. The separation of the plasma beam into an electron beam and an ion beam, such as a deuteron beam, can also be effected by the application of a magnetic field at the end of the solenoid.

Figure 3:
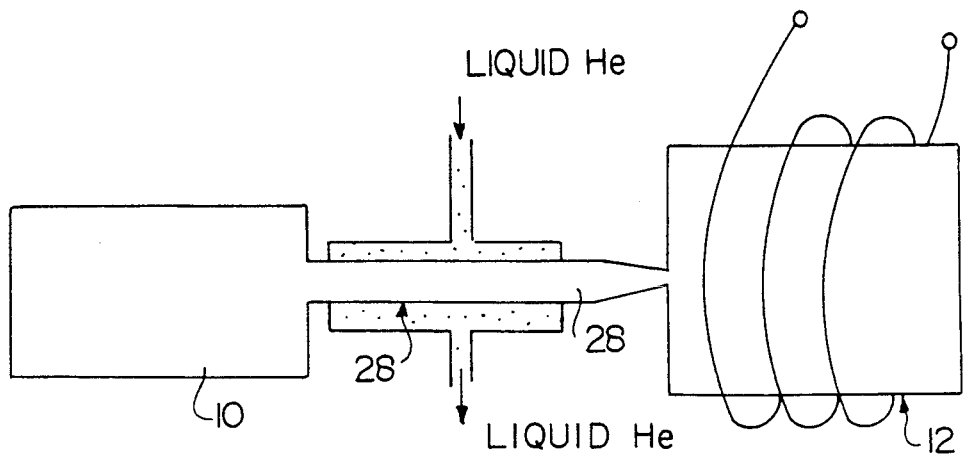
FIGS. 3 and 4 are diagrams showing alternative devices constructed in accordance with the invention.

FIG. 3 shows an alternative device constructed in accordance with the invention.

Here, the ion source 10, expansion chamber 12 and associated solenoid coil, together with skimmer 14 and solenoids 18 (if provided) may be constructed as in FIGS. 1 and 2. Here, however, the gas and plasma pass from the ion source through a heat exchanger 28 which is cooled to a low temperature by circulation of a cool gas, such as liquid helium, therethrough. In this way the neutral gas and plasma emerging from the ion source will be cooled, such as to 4° K., before expansion occurs, so further limiting the energy spread of the emergent beam from the device.

Figure 4:
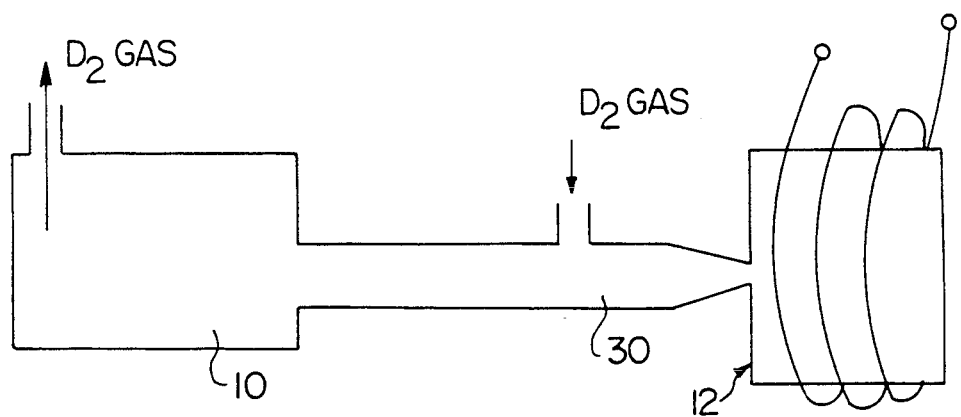

FIG. 4 shows another modification where cooling is effected in a similar way, by direct heat exchange with, say, deuterium gas or helium gas cooled to, say, about 70° K. In this case the plasma and neutral gas from the ion source 10 pass from the ion source to the plasma expansion chamber 12, via a chamber 30 through which the helium gas passes in counter flow. The deuterium gas is removed by withdrawal through the ion source itself.

The skimmer 14 is not shown in FIGS. 3 and 4 but may be provided at a suitable location, such as before the entrance to the expansion chamber.

While the described arrangement utilizes a microwave plasma generator, other forms of plasma generator may likewise be employed. For example, instead of the microwave plasma generator described, it is possible to generate plasma from a laser. For a laser plasma generator, it is possible to use very cold gas such as 5° K. $^3$He gas to begin with. Then a high power pulsed $CO_2$ laser is used to ignite the plasma, and a continuous low power (100 watt to 1 kw) $CO_2$ laser emits light which is focused on a small region where a steady plasma can be sustained. Laser plasma generators have several advantages over microwave plasma generators:

(1) The ion density is much higher. For example, one experiment (N.S. Generator et al. Soviet Physics JETP 34, 763 (1972)) reported a value of $N_i \simeq 5 \times 10^{17}/cm^3$, which is $10^5$ times higher than that normally obtained by the microwave plasma generator.

(2) The pressure of the gas can be very high, at least up to 16 atmospheric pressure ($\simeq 10^4$ torr) or above. Normally, microwave generators operate at much lower pressure.

(3) The plasma region is small, and so the neutral gas can be kept cool. The initial temperature before expansion can start off at say 5° K. rather than 1000° K. as in the case of microwave plasma generator.

Hence, with laser generated plasma followed by expansion it is possible to generate a coherent beam of $^3\text{He}+$ ions.

The described skimmer and expansion chamber may be formed in a fashion described by Donald H. Levy, Ann. Rev. Phys. Chem. 1980 31: 197–225 (1980). Exit of the beam from the expansion chamber can be effected via a nozzle such as in the range 10 μm to 1 mm diameter. Thus the pumps associated with the expansion chamber should be of sufficient capacity to ensure substantial evacuation of gas from the chamber notwithstanding possible ingress through the nozzle.

If the method and apparatus of the invention are to produce a coherent particle beam, the ion source must produce charged bosons.

However, the apparatus and method of the invention are useful for cooling particles not being bosons, such as electrons and protons.

The gases used to produce ions in practicing the invention, include deuterium, helium, noble gases, lithium, sodium and caesium. Generally, any ion source producing charged bosons (i.e. charged particles having integer spin) may be employed.

The invention may be used for producing energy by nuclear fusion processes involving directing one or more particle beams to material capable of undergoing nuclear fusion such as deuterium and/or tritium. In this application the beam formed by the invention may be accelerated by use of conventional accelerators before being so directed. The material against which the beam is directed may, for example, be in the form of pellets, as known, and several beams may be directed simultaneously from different directions. In this application the beam or beams preferably comprise bosons, more preferably coherent bosons.

The described arrangements have been advanced merely by way of explanation and many modifications may be made thereto without departing from the spirit and scope of the invention which includes every novel feature and combination of novel features herein disclosed.

I claim:

1. An apparatus for cooling a plasma comprising:
   an ion source for producing the plasma together with neutral gas;
   a substantially evacuatable plasma expansion chamber;
   magnetic means associated with the expansion chamber; and
   means for substantially evacuating the expansion chamber, the expansion chamber being coupled to the ion source whereby the plasma and neutral gas generated in the ion source are directed to and expand within the substantially evacuated chamber, the magnetic means creating a magnetic field which moves said plasma through the expansion chamber while generally maintaining the density of said plasma as said neutral gas expands, said expansion of said neutral gas and the collision of the plasma with said neutral gas effecting a reduction of the temperature of the plasma.

2. The apparatus for cooling a plasma in claim 1, wherein the expansion chamber is provided with exit means for exit of the expanded plasma therefrom.

3. The apparatus for cooling a plasma as claimed in claim 1 whereby the expanding plasma is subjected to said magnetic field to effect at least a partial exclusion of neutral gas from the plasma emerging from the expansion chamber.

4. The apparatus for cooling a plasma as claimed in claim 1, including a skimmer positioned to exclude ions having substantial transverse velocities from passing from the ion source to the expansion chamber.

5. The apparatus for cooling a plasma as claimed in claim 1, wherein the plasma and neutral gas are pre-cooled by heat exchange before expansion.

6. The apparatus for cooling a plasma as claimed in claim 4 wherein the plasma and neutral gas are pre-cooled by heat exchange before expansion.

7. A method of cooling a plasma comprising: directing the plasma in neutral gas together to a substantially evacuated plasma expansion chamber, said expansion chamber being subjected to a magnetic field to move said plasma therethrough, whereby the plasma and neutral gas expand within said expansion chamber, the temperature of the plasma being reduced by the collision of the plasma with the neutral gas during said expansion.

8. The method of cooling a plasma as claimed in claim 7, further comprising exiting the cooled plasma from the expansion chamber.

9. The method of cooling a plasma as claimed in claim 8 wherein the subjecting of said plasma in the expansion chamber to a magnetic field enables at least the partial exclusion of neutral gas from the plasma emerging from the expansion chamber.

10. The method of cooling a plasma as claimed in claim 7, wherein an ion source is used to create said plasma and said neutral gas and said method further comprises passing ions from the ion source through a skimmer to exclude ions having large transverse velocities from entering the expansion chamber.

11. The method of cooling a plasma as claimed in claim 7, wherein the plasma is so cooled that the plasma forms a coherent beam.

12. The method of cooling a plasma as claimed in claim 10 wherein the plasma is so cooled that the plasma forms a coherent beam.

13. The method of cooling a plasma as claimed in claim 7 wherein the plasma is cooled by heat exchange prior to the expansion.

14. The method of cooling a plasma as claimed in claim 10 wherein the plasma is cooled by heat exchange prior to the expansion.

15. A fusion reactor comprising apparatus for cooling a plasma comprising: an ion source for producing the plasma together with neutral gas; a substantially evacuatable plasma expansion chamber; magnetic means associated with said expansion chamber; and means for substantially evacuating the expansion chamber, the expansion chamber being coupled to the ion source whereby the plasma and the neutral gas generated in the ion source are directed to and expand within the substantially evacuated chamber, said magnetic means acting to direct said plasma through said chamber and enable at least the partial separation of neutral gas from said plasma, said expansion of said neutral gas and the collision of the plasma with said neutral gas effecting the cooling of said plasma; and an accelerator and director means to accelerate and direct a beam of particles from the plasma.

16. A method of generating energy by nuclear fusion comprising: forming a beam of particles by forming a plasma and neutral gas; directing the plasma and neutral gas together to a substantially evacuated plasma expansion chamber associated with a magnetic field, whereby the plasma and the neutral gas expand and move through said expansion chamber, said magnetic field facilitating the movement of said plasma and at least the partial separation of neutral gases from said plasma, said expansion of said neutral gas and the collision of the plasma with said neutral gas effecting the cooling of said plasma whereby the plasma forms said beam, accelerating said beam and directing the beam upon its exit from said expansion chamber.

17. The method of cooling a plasma as claimed in claim 8 wherein the plasma is cooled by heat exchange prior to the expansion.

18. The method of cooling a plasma as claimed in claim 9 wherein the plasma is cooled by heat exchange prior to said expansion.

19. A method of cooling plasma comprising: directing the plasma and neutral gas to a substantially evacuated plasma expansion chamber such that the plasma and the neutral gas are subjected to expansionary influence due to the existence of reduced pressure in the expansion chamber; exposing said plasma to a magnetic field so that the tendency of the plasma to expand is at least substantially suppressed by application of the magnetic field thereto and the neutral gas is permitted to expand in the expansion chamber, whereby the neutral gas is cooled by such expansion and the plasma is cooled by collision with the cooled neutral gas.

20. An apparatus for cooling plasma comprising: an ion source for producing plasma together with neutral gas; a substantially evacuable plasma expansion chamber; magnetic means associated with said expansion chamber; and means for substantially evacuating the expansion chamber, the expansion chamber being coupled to the ion source whereby the plasma and neutral gas generated in the ion source are directed to the substantially evacuated chamber such that the plasma and neutral gas are subjected to expansionary influence due to the existence of the reduced pressure in the expansion chamber, the tendency of the plasma to so expand being at least substantially suppressed by the magnetic field, whilst the neutral gas expands in the expansion chamber, whereby the neutral gas is cooled by said expansion and the plasma is cooled by collision with the cooled neutral gas.

* * * * *